(12) United States Patent
Peranandam et al.

(10) Patent No.: US 8,683,442 B2
(45) Date of Patent: Mar. 25, 2014

(54) SOFTWARE TEST CASE GENERATION FROM A PARTIAL DESIGN MODEL

(75) Inventors: Prakash Mohan Peranandam, Karnataka (IN); Ambar A. Gadkari, Bangalore (IN); Ramesh Sethu, Bangalore (IN)

(73) Assignee: GM Global Technology Operations LLC, Detroit, MI (US)

( * ) Notice: Subject to any disclaimer, the term of this patent is extended or adjusted under 35 U.S.C. 154(b) by 352 days.

(21) Appl. No.: 13/238,110

(22) Filed: Sep. 21, 2011

(65) Prior Publication Data
US 2013/0074040 A1 Mar. 21, 2013

(51) Int. Cl.
*G06F 9/44* (2006.01)

(52) U.S. Cl.
USPC .......................................................... 717/124

(58) Field of Classification Search
USPC .............................. 717/124, 126, 135; 714/38
See application file for complete search history.

(56) References Cited

U.S. PATENT DOCUMENTS

| | | | | |
|---|---|---|---|---|
| 5,754,760 A | * | 5/1998 | Warfield | 714/38.1 |
| 6,944,848 B2 | * | 9/2005 | Hartman et al. | 717/124 |
| 7,024,589 B2 | * | 4/2006 | Hartman et al. | 714/32 |
| 7,055,065 B2 | * | 5/2006 | Farchi et al. | 714/38.1 |
| 7,644,398 B2 | * | 1/2010 | Cleaveland et al. | 717/135 |
| 2003/0014734 A1 | * | 1/2003 | Hartman et al. | 717/125 |
| 2009/0018811 A1 | * | 1/2009 | Paradkar et al. | 703/22 |
| 2011/0145653 A1 | * | 6/2011 | Broadfoot et al. | 714/38.1 |

OTHER PUBLICATIONS

Robinson-Mallett et al., "Using communication coverage criteria and partial model generation to assist software integration testing", 2008.*
Benoit Baudry, "Testing Model Transformations: A case for test Generation from input Domain Models", 2010.*

* cited by examiner

*Primary Examiner* — Phillip H Nguyen
(74) *Attorney, Agent, or Firm* — Quinn Law Group, PLLC

(57) ABSTRACT

A method allows for testing software under test (SUT) with respect to a partial design model (PDM) having a boundary which differs from a boundary of the SUT. The method includes recording input information including the SUT, the PDM, and coverage criteria defining a required number of the test cases. Variables in the SUT are identified that correspond to boundary signals for the PDM. Test cases are extracted meeting the coverage criteria. The method may include generating additional test cases at the PDM level and mapping the additional cases with corresponding constraint functions to the boundary of the SUT using a forward/backward propagation and/or heuristics guided technique. A system for testing the SUT includes a host machine and memory. The host machine executes process instructions from memory to identify variables in the SUT that correspond to boundary signals for the PDM, and extracts test cases meeting the coverage criteria.

19 Claims, 1 Drawing Sheet

SOFTWARE TEST CASE GENERATION FROM A PARTIAL DESIGN MODEL

TECHNICAL FIELD

The present disclosure relates to the automated generation of test cases for the testing of software code with respect to a partial design model.

BACKGROUND

Various automated approaches exist for testing the programming code embodying a suite of software under development. Model-based testing (MBT) is one particularly useful "black box" software testing approach. MBT involves the automated generation of test cases using a high-level state machine or another suitable model of the implementation code. Input signals are applied to the boundary of the model, and the response of the model is closely observed. The equivalent code is tested to determine whether the code provides the same input/output sequence as the model. Relatively broad coverage of the input domain can be achieved using conventional MBT techniques without the need for manual generation of a large number of test cases.

For conventional MBT methods, the input/output (I/O) boundary of the model must match the I/O boundary of the software code that is being tested. However, in actual practice high-level models tend to either be partial or even absent, thus rendering conventional MBT methods less than optimal. The reasons for this model boundary discrepancy can vary. For instance, software may be developed incrementally over time, with some programming teams creating different portions of the software code. In other scenarios, software programmers may proceed directly to writing the code without first modeling the software. As a result, only some portions of the overall code may have a corresponding model. In the automotive industry and other industries having large, diverse manufacturing facilities using a host of different software, different pieces of software may be provided from different vendors. All of these factors may combine to frustrate all but the most theoretical applications of conventional MBT methods.

SUMMARY

Accordingly, a method is disclosed herein for automatically generating test cases for the testing of software implementation code with respect to a partial design model. The input-output (I/O) signals on the boundary of the implementation software could differ from the I/O signals at the partial model boundary. Conventional MBT techniques cannot be effectively applied in such situations. Information is extracted as disclosed herein from both the software and the partial model(s) for generating the required test cases. The generated test cases guarantee certain qualitative coverage metrics based on the structure of the partial model. In this manner, the presently disclosed method and system can be used to determine the quality of generated test suites.

In particular, a method is disclosed herein for testing software under test (SUT code) with respect to a partial design model (PDM) having boundaries that are different than those of the SUT code. The method includes recording a set of input information, including the SUT code, the PDM, and coverage criteria defining the required number of the test cases. The method further includes identifying, via a host machine, a set of variables in the SUT that correspond to I/O boundary signals of the PDM. A set of test cases is then extracted that meets the coverage criteria using the SUT, the PDM, and the set of variables. The host machine may be used to test the SUT code using the extracted set of test cases.

Extracting a set of test cases may include generating an initial set of test cases from the SUT code, and then measuring coverage of the initial set of test cases on the PDM. The method may also include generating an additional set of test cases at the level of the PDM, and then mapping the additional set of test cases with corresponding constraint functions to the boundary of the SUT code using forward/backward propagation or a heuristic-based guiding technique. The host machine may then be used to solve the corresponding constraint functions to generate other portions of the test case, and to obtain the complete or matching test case with respect to the SUT.

A system for testing the SUT with respect to the PDM includes a host machine and memory. The host machine receives and records an input set, including the SUT, the PDM, and coverage criteria defining a required number of the test cases. The memory records process instructions for testing the SUT. The host machine is configured to execute the process instructions to identify variables in the SUT that correspond to I/O boundary signals for the PDM, and to extract test cases. The test cases meet the coverage criteria using the SUT, the PDM, and the set of variables.

The above features and advantages are readily apparent from the following detailed description of the best modes for carrying out the invention when taken in connection with the accompanying drawings.

DESCRIPTION

Figure 1:
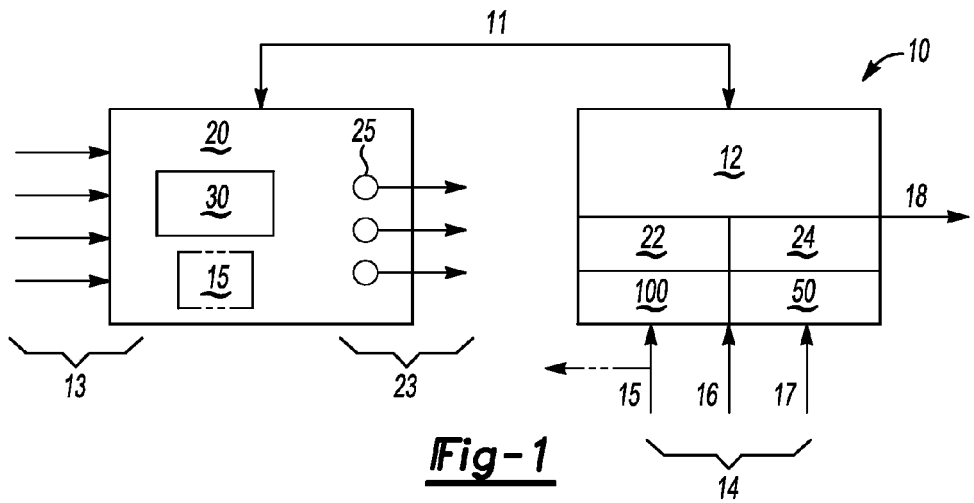
FIG. 1 is a schematic illustration of a system for generating test cases for the testing of software implementation code with respect to a partial design model or module.

With reference to the drawings, wherein like reference numbers refer to the same or similar components throughout the several views, a system 10 is shown schematically in FIG. 1. The present system 10 is configured for automatically generating test cases for the testing of software implementation code, i.e., software under test (SUT) 15, with respect to a partial design model (PDM) as explained below. When fully tested and validated, the SUT 15 may be ultimately loaded into memory of a corresponding device 20.

The device 20 may be any mechanical, electrical, or electro-mechanical system, e.g., a braking system for a vehicle or any other vehicular/non-vehicular system or device running software as part of its operation. The device 20 thus includes a processor 30 suitable for executing such process instructions, or is at least in communication with a separate device providing this function. Data ports 25, which may include wires, communications ports, terminals, and/or other suitable data collection points, are present in the device 20 and configured for outputting a set of output signals 23 as needed.

The device 20 may, as a routine part of its ordinary function, receive a set of input signals 13 and generate the set of output signals 23 in response thereto, or in a manner varying with the internal operation of the device 20. For instance, in keeping with the above braking system example, the input signals 13 may be a throttle level and a braking level. The former may be detected by measuring the apply level of an accelerator pedal (not shown), while the latter may be known by measuring the apply level of a brake pedal (also not shown). The output signals 23 here may represent, by way of a non-limiting example, the variable speed of the vehicle. Naturally, other embodiments of the device 20 may use different input and output signals, with the number of input/output signals varying with the design and use of device 20.

The system 10 may include a server or a host machine 12 configured for executing process instructions embodying the present method 100, an example embodiment of which is described below with reference to FIG. 3. In executing such process instructions, the system 10 as a whole automatically generates test cases for the testing of software implementation code for the SUT 15, which after testing can be installed in the device 20 as shown in phantom.

The system 10 generates the test cases with respect to the PDM 16 via the host machine 12. Conventional model-based testing (MBT) methods are incapable of adequately handling such partial design models due in part to the boundary discrepancy noted above. In some embodiments, the host machine 12 may be placed in communication with the device 20 as indicated by double arrow 11. Such an embodiment may enable periodic on-line testing of the device 20 to ensure correct functioning of the loaded software.

The system 10 of FIG. 1 may have one or more processors 22 and memory 24. Memory 24 may be embodied as non-volatile or volatile media. Non-volatile media may include, for example, optical or magnetic disks and other persistent memory. Example volatile media may include dynamic random access memory (DRAM), which may constitute a main memory. Other examples of embodiments for memory include a floppy, flexible disk, or hard disk, magnetic tape or other magnetic medium, a CD-ROM, DVD, and/or any other optical medium, as well as other possible memory devices such as flash memory. Memory 24 may include any non-transitory/tangible medium which participates in providing data or computer-readable instructions.

The host machine 12 may include any other required hardware and software components needed for executing the present method 100. For instance, the host machine 12 may include a high-speed clock, analog-to-digital (A/D) circuitry, digital-to-analog (D/A) circuitry, and any required input/output (I/O) circuitry, I/O devices, and communication interfaces, as well as signal conditioning and buffer electronics.

The host machine 12 shown in FIG. 1 is configured to receive an input set 14 and record the input set 14 in memory 24. The input set 14 may include at least the SUT 15, the PDM 16, and test coverage criteria 17. A test generation tool 50 that implements the present method 100 provides test generation capability as described below with reference to FIGS. 2 and 3. That is, by processing the input set 14, the host machine 12 can use the tool 50 to extract an output set 18, with the output set 18 forming a specific set of test cases or targets for testing the SUT 15.

Figure 2:
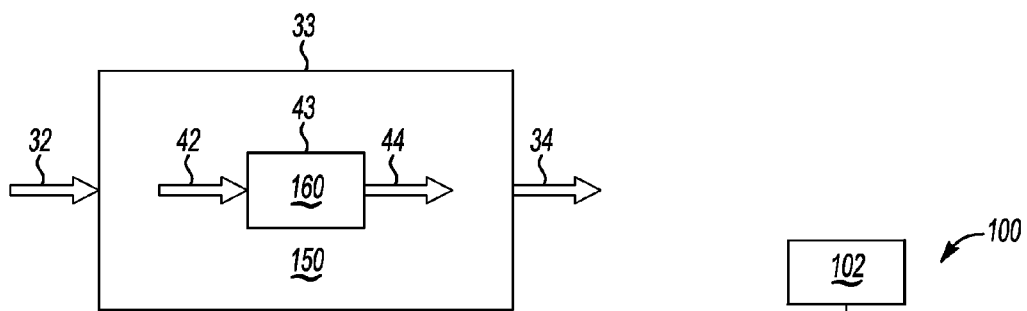
FIG. 2 is a schematic logic flow diagram for the input/output (I/O) signals and boundaries of software implementation code and a partial model or module.

Referring to FIG. 2, a basic logic flow diagram describes the boundary conditions occurring with a partial model (high-level model), e.g., the PDM 16 of FIG. 1. Here, there is no effective way to establish conformance of the SUT 15 of FIG. 1 with the respect to a high-level model, nor of determining the extent of test coverage of the various test scenarios or targets with respect to such a high level model. That is, the portion of the SUT 15 to which the PDM 16 of FIG. 1 corresponds can be represented as a partial model code 160 having a boundary 43. The SUT code 150 of the SUT 15 shown in FIG. 1 has a different boundary 33. The values to input signals 32 directed to the boundary 33 produce values in output signals 34 from the SUT code 150. Because of the differences between the boundaries 33 and 43 of the respective SUT code 150 and the partial model code 160, the values of the input signals 42 to the partial model code 160 can produce different values in the output signals 44 from the partial model code 160 that differ from the respective values of the input and output signals 32 and 34 of the SUT code 150.

The present system 10 of FIG. 1 therefore generates an initial set of test cases from the SUT code 150 and logs the boundary values on the partial model code 160 for this initial set of test cases. The logged values by the host machine 12 are used in PDM 16 to measure the coverage obtained by the initial set of test cases. As noted above, the system 10 identifies the partial model code 160 boundaries in the SUT code 150 and enables such logging capability of the boundary 43. The host machine 12 of FIG. 1 strives for full test coverage with respect to the specific coverage criteria 17 shown in FIG. 1.

Therefore, in order to achieve full test coverage, the host machine 12 of FIG. 1 also generates additional test cases at the level of the PDM 16 and maps these test cases back to the boundary 33 of the SUT code 150, e.g., using forward/backward propagation techniques and/or heuristic guided techniques. The test cases from PDM 16 may be the values of the boundary 43. The values of the boundary 43 are then forward/back-propagated to the boundary 33 of the SUT code 150. The use of propagation or guided techniques is recognized herein as a solution to the partial model problem. However, the actual methodology of such techniques would be readily understood by one of ordinary skill in the art. A detailed explanation of these techniques is therefore dispensed with herein in the interest of simplicity.

Figure 3:
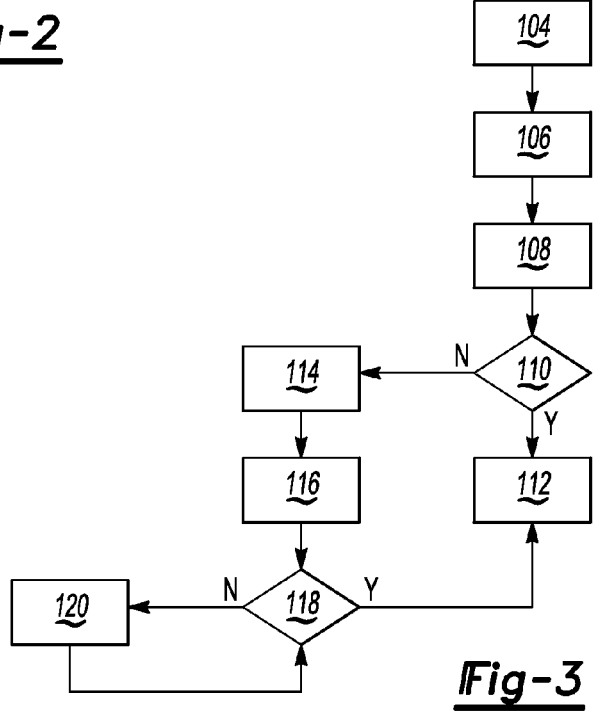
FIG. 3 is a flow chart describing an embodiment of the present method.

Referring to FIG. 3, an example embodiment of the present method 100 begins with step 102. As noted above, any underlying process instructions for executing each of the following steps may be programmed into the host machine 12 of FIG. 1 and automatically executed during the course of software test and validation.

At step 102, the host machine 12 of FIG. 1 receives the input set 14. Input set 14 includes, at a minimum, the implementation software or code embodying the SUT 15, the PDM 16, and the coverage criteria 17. The host machine 12 then records the input set 14 in memory 24. The PDM 16 may be generated beforehand using various commercially available modeling solutions, e.g., Rational® Rhapsody® by IBM®. The method 100 then proceeds to step 104.

At step 104, the host machine 12 then identifies partial model code 160 and the I/O boundary signals of the partial model code 160 corresponding to the PDM 16 in SUT code 150. Step 104 provides a type of "white box" view of the SUT 15, as that term is known in the art, and thus entails accessing all internals of the SUT 15, for instance all of the control variables used in the SUT 15 and their corresponding names. The method 100 proceeds to step 106 once the I/O signals have been properly mapped.

At step 106, the host machine 12 next extracts some test cases from the code of the SUT 15. Step 106 may entail simulating the code with random inputs for a predefined number of iterations. While actively simulating, the host machine 12 can simultaneously collect or log the I/O values of the partial model code corresponding to PDM 16, i.e., the input signals 42 and output signals 44 of the partial model code 160 shown in FIG. 2. The method 100 then proceeds to step 108.

At step 108, the host machine 12 simulates the PDM 16 of FIG. 1 using the logged inputs from step 106 and compares the measured outputs to expected values, e.g., as recorded in memory 24 beforehand using calibration data for the device 20 of FIG. 1. Step 108 may also include measuring the structural coverage during the simulation of the PDM 16 with the logged inputs, such as by determining the various state transitions with respect to the PDM 16 when the PDM 16 is embodied as a finite state model.

At step 110, the host machine 12 determines if the test cases generated as the output set 18 of FIG. 1 provide 100% test coverage of the PDM 16 with respect to the coverage criteria 17 shown schematically in the same Figure. If 100% coverage is achieved, the method 100 proceeds to step 112. The method 100 proceeds to step 114 if less than 100% coverage with respect to the coverage criteria 17 is achieved.

At step 112, the host machine 12 returns the test cases represented by the output signals 18 of FIG. 1, e.g., by recording the same in memory 24 of the host machine 12. The host machine 12 can thereafter execute a required control action with respect to the SUT 15, such as by validating the SUT 15 for operational release to the device 20. The method 100 is finished at this point.

At step 114, having determined at step 110 that less than 100% coverage is achieved, the host machine 12 of FIG. 1 identifies any uncovered test cases or targets in the PDM 16 and proceeds to step 116.

At step 116, the host machine 12 proceeds to automatically generate additional test data to cover these uncovered targets of the PDM 16. Two example methods for obtaining a complete test suite include a formal methods-based method and a heuristics-based guided technique to dynamically approximate expressions or functions of any test cases that are not covered by the initial set of test cases.

Of these, formal methods-based methods may include, by way of non-limiting example, the forward-propagation or back-propagation techniques alluded to above with reference to FIG. 2. That is, the host machine 12 of FIG. 1 can propagate the required constraints from the boundaries 43 of the partial model code 160 of FIG. 2 to the primary input signals 32 to the corresponding SUT code 150 of the same Figure so as to obtain a mathematical constraint expression for the test data obtained in step 116. The host machine 12 can then solve this expression for the generated/required values to generate the final test case for the SUT code 150. Thereafter, the test data can be simulated, e.g., using the Simulink portion of MATLAB, the Rhapsody environment, or other suitable means.

Alternatively, heuristics-based guidance technique or method can enable the host machine 12 of FIG. 1 to dynamically approximate the expression/functions of any uncovered test cases or targets. This alternative would require the extraction of the relationship between the primary inputs 32 of SUT code 150 and the signals entering the boundaries 43 of the partial model code 160 of FIG. 2, e.g., through predefined input patterns. The SUT code 150 of FIG. 2 is simulated with predefined input patterns and observed for the behavior of the signals at 42 and thereby extracting the relationship.

The host machine 12 can then extract the relationship of the input signals 42 of the partial model code 160 with respect to the primary input 32 of the SUT code 150. For instance, the host machine 12 could fix all but one of the inputs to a minimum constant value and linearly increase or decrease the primary inputs 32. This can be repeated for all input signals. By such means, one can determine the relationship or behavior pattern of the input signals 42 of the partial model code 160 to the primary input 32, i.e., what combination of main input increases or decreases the signal at the boundaries of the partial model code 160. This is the pattern that can be applied to obtain the required value that is the test data obtained in step 116 for the input of the partial model code 160.

Using a non-limiting illustrative example, when the device 20 of FIG. 1 is an automotive braking system, a basic pair of basic top-level inputs may include throttle input level and brake apply level. The output of such a system is a variable speed of the vehicle. In such an example, the host machine 12 of FIG. 1 can observe the response by holding braking input level at 0 (i.e., no braking), varying throttle, and observing/recording the change in vehicle speed. Likewise, the host machine 12 could hold the throttle at a constant level and observe how increasing braking input levels affects vehicle speed. Thus, to arrive at a particular vehicle speed value, the host machine 12 can learn how to manipulate the inputs to the device 20. This learned behavior can be used to provide coverage for any uncovered targets.

At step 118, the host machine 12 of FIG. 1 verifies whether 100% test coverage is now achieved. If so, the method proceeds to step 112. If not, the method 100 proceeds instead to step 120.

At step 120, the host machine 12 estimates the remaining uncovered targets. Step 120 may entail simple estimation, e.g., using heuristic methods as described above. Step 120 is repeated in a loop until all test cases have been resolved or 100% test coverage is achieved, then proceeds to step 112.

While the best modes for carrying out the invention have been described in detail, those familiar with the art to which this invention relates will recognize various alternative designs and embodiments for practicing the invention within the scope of the appended claims.

The invention claimed is:

1. A method for testing software under test (SUT) with respect to a partial design model (PDM) having a boundary which differs from a boundary of the SUT, the method comprising:
   recording a set of input information, including the SUT, the PDM, and coverage criteria defining a required number of the test cases;
   identifying, via a host machine, a set of variables in the SUT that corresponds to boundary signals for the PDM; and
   extracting a set of test cases meeting the coverage criteria using the SUT, the PDM, and the set of variables.

2. The method of claim 1, further comprising:
   using the host machine to test the SUT using the extracted set of test cases.

3. The method of claim 1, wherein extracting a set of test cases includes:
   generating an initial set of test cases from the SUT; and
   measuring coverage of the initial set of test cases on the PDM.

4. The method of claim 3, further comprising:
   generating an additional set of test cases at the level of the PDM;
   mapping the additional set of test cases with corresponding constraint functions to the boundary of the SUT using one of a propagation technique and a heuristics guided technique; and
   using the host machine to solve the corresponding constraint functions.

5. The method of claim 4, further comprising:
   mapping a set of input signals of the SUT to a corresponding input signal value in the PDM.

6. The method of claim 5, wherein mapping a set of input signals to the SUT includes collecting constraint functions for every data port used in a device running the SUT.

7. The method of claim 1, further comprising:
   logging the input and output (I/O) values of the PDM while simulating the SUT with random inputs for a predefined number of iterations; and
   simulating the PDM with the logged inputs; and
   comparing the outputs of the PDM to a set of expected outputs.

8. A system for testing software under test (SUT) with respect to a partial design model (PDM) having a boundary which differs from a boundary of the SUT, the system comprising:
   a host machine which receives and records an input set, including the SUT, the PDM, and coverage criteria defining a required number of the test cases; and
   tangible/non-transitory memory on which is recorded a test generation tool and a set of process instructions for testing the SUT;
   wherein the host machine is configured to execute the process instructions to thereby identify a set of variables in the SUT that correspond to boundary signals for the PDM, and to extract a set of test cases meeting the coverage criteria using the SUT, the PDM, and the set of variables.

9. The system of claim 8, wherein the host machine is configured to:
   generate an initial version of the set of test cases from the SUT; and
   measure the coverage of the initial version of the set of test cases on the PDM.

10. The system of claim 8, wherein the host machine executes one of a forward or a backward propagation technique to automatically map at least some of the test cases from the PDM to the SUT.

11. The system of claim 8, wherein the host machine is configured to extract the set of test cases by:
    generating an initial set of test cases from the SUT; and
    measuring coverage of the initial set of test cases on the PDM.

12. The system of claim 8, wherein the host machine is configured for:
    generating an additional set of test cases at the level of the PDM;
    mapping the additional set of test cases with corresponding constraint functions to the boundary of the SUT using one of a forward-propagation technique, a backward propagation technique, and a heuristics guided technique; and
    using the host machine to solve the corresponding constraint functions.

13. The system of claim 8, wherein the host machine is configured for:
    mapping a set of input signals to the SUT to a corresponding value in the PDM.

14. The system of claim 8, wherein:
    the host machine is in communication with an additional system under test which has a plurality of data ports;
    the host machine uses the SUT to control a function of the additional system; and
    the host machine is configured for mapping the set of input signals to the SUT by collecting constraint functions for every data port used in the additional system.

15. The system of claim 8, wherein the host machine is further configured for:
    logging the input and output (I/O) values of the PDM while simulating the SUT code with random inputs for a predefined number of iterations;
    simulating the PDM with the logged inputs; and
    comparing the outputs of the PDM to a set of expected outputs.

16. A method for testing software under test (SUT) with respect to a partial design model (PDM) having a boundary which differs from a boundary of the SUT, the method comprising:
    recording a set of input information, including the SUT, the PDM, and coverage criteria defining a required number of the test cases;
    identifying, via a host machine, a set of variables in the SUT that corresponds to boundary signals for the PDM;
    extracting a set of test cases meeting the coverage criteria using the SUT, the PDM, and the set of variables, including:
        generating an initial set of test cases from the SUT; and
        measuring coverage of the initial set of test cases on the PDM;
    mapping a set of input signals to the SUT to a corresponding value in the PDM; and
    using the host machine to test the SUT using the extracted set of test cases.

17. The method of claim 16, further comprising:
    generating an additional set of test cases at the level of the PDM;
    mapping the additional set of test cases with corresponding constraint functions to the boundary of the SUT; and
    using the host machine to solve the corresponding constraint functions.

18. The method of claim 17, further comprising:
    logging the input and output (I/O) values of the PDM while simulating the SUT code with random inputs for a predefined number of iterations;
    simulating the PDM with the logged inputs; and
    comparing the outputs of the PDM to a set of expected outputs.

19. The method of claim 16, further comprising:
    using a heuristics-based guided technique to dynamically approximate expressions or functions of any test cases that are not covered by the initial set of test cases.

* * * * *